(12) United States Patent
Niewiadomski et al.

(10) Patent No.: US 11,479,297 B2
(45) Date of Patent: Oct. 25, 2022

(54) OVERSHOOT PROTECTION IN HITCH ASSIST OPERATION

(71) Applicant: Ford Global Technologies, LLC, Dearborn, MI (US)

(72) Inventors: Luke Niewiadomski, Dearborn, MI (US); Li Xu, Northville, MI (US); Donald Jacob Mattern, Canton, MI (US); Mohamed El-sawah, Farmington Hills, MI (US); Roger Arnold Trombley, Ann Arbor, MI (US); Douglas Rogan, Mountain View, CA (US); Nikhil Nagraj Rao, Cupertino, CA (US); Arnav Sharma, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 440 days.

(21) Appl. No.: 16/565,682

(22) Filed: Sep. 10, 2019

(65) Prior Publication Data

US 2021/0070357 A1 Mar. 11, 2021

(51) Int. Cl.
| | |
|---|---|
| *B62D 15/02* | (2006.01) |
| *B60W 10/04* | (2006.01) |
| *B60W 10/18* | (2012.01) |
| *B60W 10/20* | (2006.01) |
| *G05D 1/02* | (2020.01) |

(52) U.S. Cl.
CPC .......... *B62D 15/025* (2013.01); *B60W 10/04* (2013.01); *B60W 10/18* (2013.01); *B60W 10/20* (2013.01); *G05D 1/0231* (2013.01)

(58) Field of Classification Search
None
See application file for complete search history.

(56) References Cited

U.S. PATENT DOCUMENTS

| | | |
|---|---|---|
| 6,120,052 A | 9/2000 | Capik et al. |
| 6,480,104 B1 | 11/2002 | Wall et al. |
| 6,769,709 B1 | 8/2004 | Piper et al. |
| 6,820,888 B1 | 11/2004 | Griffin |
| 7,237,790 B2 | 7/2007 | Gehring et al. |
| 7,429,051 B2 | 9/2008 | Bauer et al. |
| 8,191,915 B2 | 6/2012 | Freese, V et al. |
| 9,145,116 B2 | 9/2015 | Clarke et al. |
| 9,766,625 B2 | 9/2017 | Boroditsky et al. |

(Continued)

*Primary Examiner* — Todd Melton
*Assistant Examiner* — Jason R Roberson
(74) *Attorney, Agent, or Firm* — Gregory Brown; Price Heneveld LLP

(57) ABSTRACT

A vehicle system configured to control a trailer alignment routine includes a hitch mounted on a vehicle and a controller. The controller is configured to identify a coupler position of a trailer and control motion of the vehicle to toward an aligned position. The controller is further configured to control a braking procedure of the vehicle including a plurality of concurrent deceleration control procedures in response to a portion of the vehicle passing a gradual stopping distance. The concurrent deceleration procedures include monitoring an elapsed time following the portion of the vehicle passing the gradual stopping distance and monitoring a remaining distance to the aligned position based on a velocity of the vehicle and comparing the remaining distance to a rapid stopping distance.

20 Claims, 10 Drawing Sheets

(56) References Cited

U.S. PATENT DOCUMENTS

| | | | |
|---|---|---|---|
| 2013/0226390 A1 | 8/2013 | Luo et al. | |
| 2015/0210280 A1* | 7/2015 | Agnew | B60W 10/192 |
| | | | 701/70 |
| 2016/0052548 A1 | 2/2016 | Singh et al. | |
| 2016/0121885 A1* | 5/2016 | Windeler | B60T 7/20 |
| | | | 701/1 |
| 2016/0288601 A1* | 10/2016 | Gehrke | B60Q 5/006 |
| 2017/0151846 A1* | 6/2017 | Wuergler | B62D 15/029 |
| 2017/0334413 A1* | 11/2017 | Murakoshi | B60R 1/00 |
| 2018/0039278 A1* | 2/2018 | Hüger | G06T 7/70 |
| 2019/0086927 A1* | 3/2019 | Skvarce | G05D 1/0278 |
| 2019/0291728 A1* | 9/2019 | Shalev-Shwartz | B60T 7/22 |
| 2019/0339704 A1* | 11/2019 | Yu | G06T 7/174 |

\* cited by examiner

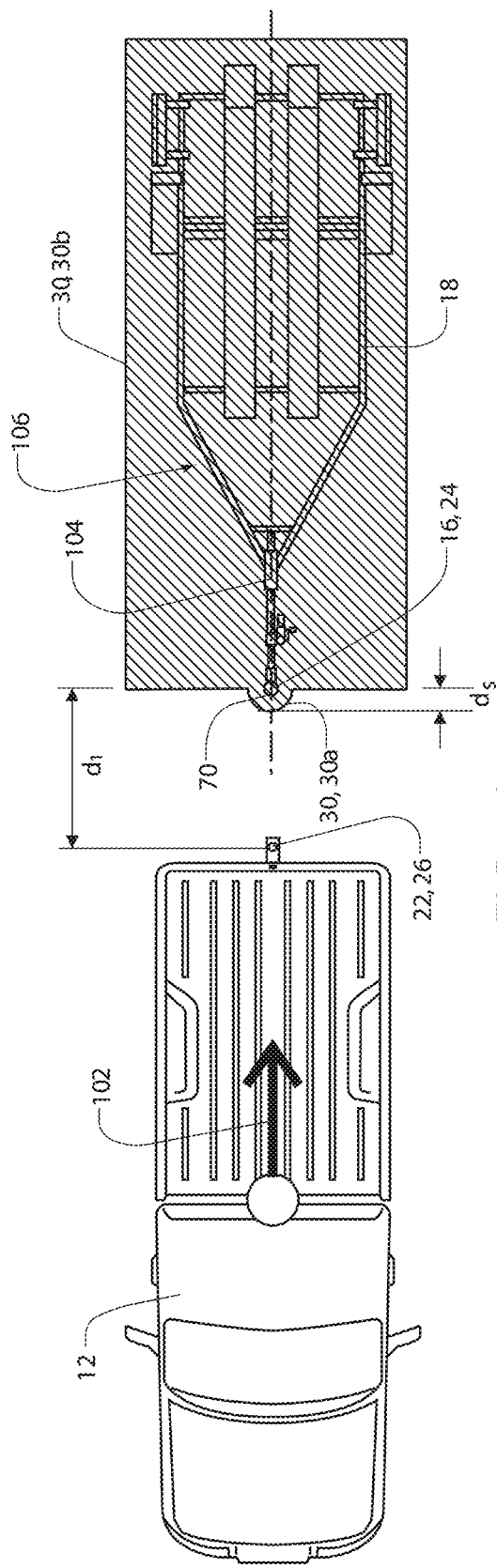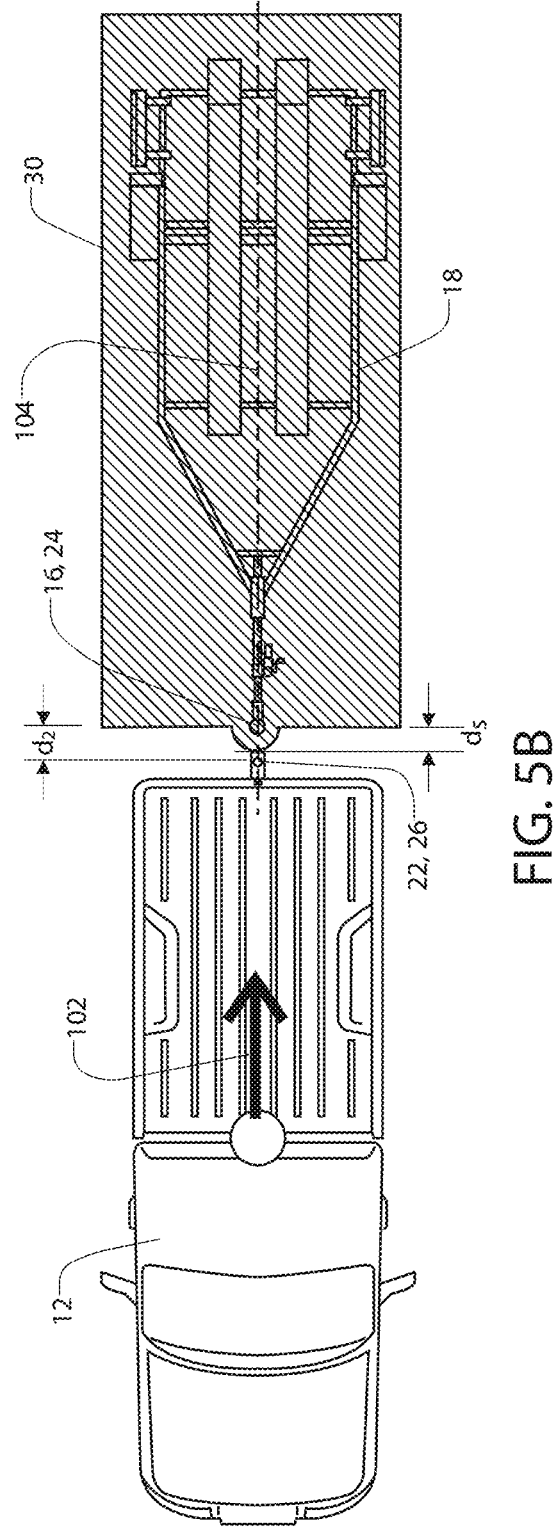

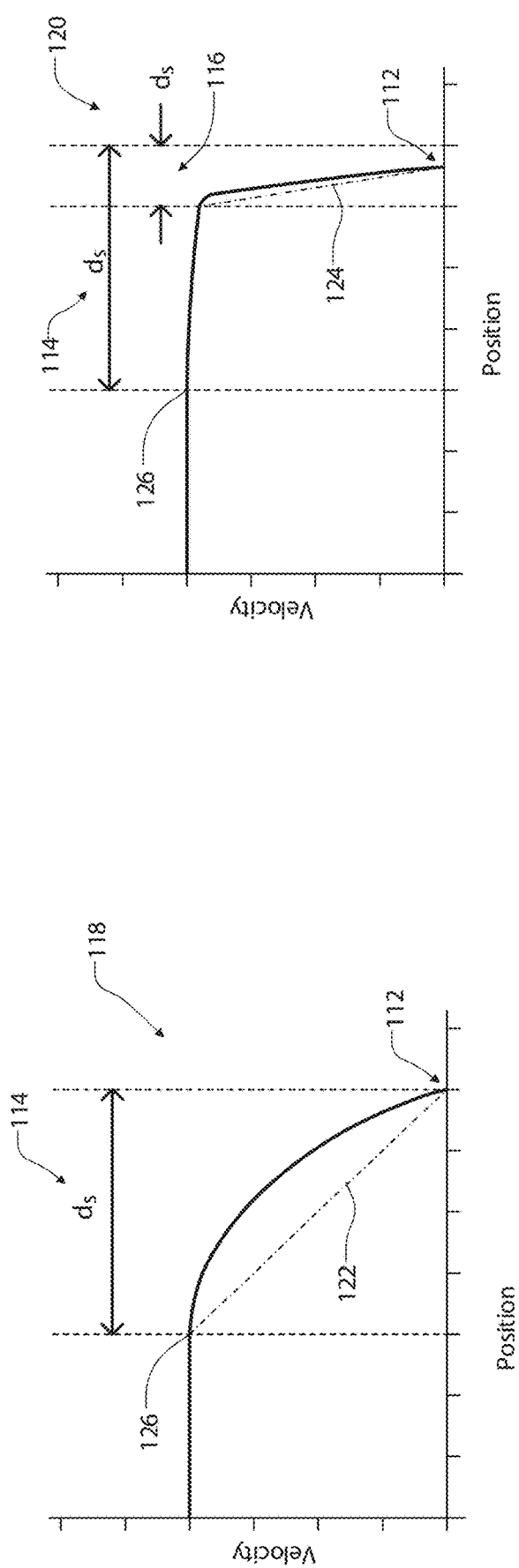

OVERSHOOT PROTECTION IN HITCH ASSIST OPERATION

FIELD OF THE DISCLOSURE

The present disclosure generally relates to a system for assisting in a vehicle-trailer hitching operation. In particular, the present disclosure relates to a system for controlling an alignment between a vehicle and a coupler of a trailer.

BACKGROUND OF THE DISCLOSURE

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires an inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause contact between the vehicle and the trailer. Accordingly, further advancements may be desired.

SUMMARY OF THE DISCLOSURE

According to one aspect of the present disclosure, a vehicle system is disclosed. The system is configured to control a trailer alignment routine. The system comprises a hitch mounted on a vehicle and a controller. The controller is configured to identify a coupler position of a trailer and control motion of the vehicle to toward an aligned position. The controller is further configured to calculate a gradual stopping distance based on a velocity of the vehicle and control a braking procedure comprising a plurality of concurrent deceleration control procedures in response to a portion of the vehicle passing the gradual stopping distance. The concurrent deceleration procedures comprise monitoring an elapsed time following the portion of the vehicle passing the gradual stopping distance and monitoring the remaining distance based on the velocity of the vehicle and comparing the remaining distance to a rapid stopping distance.

Embodiments of various aspects of the disclosure can include any one or a combination of the following features:
 the concurrent deceleration procedures further comprise processing a gradual deceleration request based on the remaining distance to the coupler position and the velocity of the vehicle at the gradual stopping distance;
 the controller is further configured to control the gradual deceleration request by controlling a deceleration of the vehicle based on a first deceleration profile;
 the controller is further configured to calculate the gradual stopping distance based on the first deceleration profile;
 the gradual stopping distance is calculated based on the velocity and a rate of deceleration of the first deceleration profile; the controller is configured to apply a second deceleration profile in response to each of: the elapsed time reaching a calculated time duration; and the portion of the vehicle passing the rapid stopping distance at the velocity greater than a controlled velocity associated with the first deceleration profile;
 the first deceleration profile comprises a lower average rate of deceleration relative to the second deceleration profile;
 the controller is further configured to: control the vehicle to stop over a second deceleration profile in response to the elapsed time reaching a calculated time duration;
 the controller is further configured to control the vehicle to stop over the second deceleration profile in response in response to the hitch passing the rapid stopping distance at a velocity exceeding a rapid stopping distance;
 the controller is configured to abort the alignment routine in response to the detection of an operating error, wherein aborting the alignment routine comprises stopping the vehicle via a second deceleration profile;
 the controller is further configured to abort the trailer alignment routine in response to a hitch length being less than a minimum hitch length;
 the hitch length is detected by at least one of an image sensor and a proximity sensor in communication with the controller;
 a proximity sensor configured to detect a proximity distance to the coupler; and wherein the controller is further configured to: compare the proximity distance to the remaining distance; and in response to a difference between the proximity distance and the remaining distance being greater than an error threshold, abort the alignment routine;
 the controller is further configured to: calculate a calculated distance to the aligned position in response to the velocity, steering angle, and time following the gradual deceleration request; and in response to a difference between the calculated distance and the remaining distance being greater than an error threshold, abort the alignment routine; and
 a yaw rate sensor configured to detect acceleration data of the vehicle; and wherein the controller is further configured to determine the calculated distance to the aligned position based on the acceleration data.

According to another aspect of the present disclosure, a method for controlling an alignment route for a vehicle is disclosed. The method comprises identifying a coupler position of a trailer in the sensor data and controlling motion of the vehicle to an aligned position aligning a hitch ball of the vehicle with the coupler position. The method further comprises calculating a gradual stopping distance based on a velocity of the vehicle and controlling a braking procedure comprising a plurality of concurrent deceleration control procedures in response to a portion of the vehicle passing the gradual stopping distance. The concurrent deceleration procedures comprise monitoring an elapsed time following the portion of the vehicle passing the gradual stopping distance; and monitoring the remaining distance based on the velocity of the vehicle and comparing the remaining distance to a rapid stopping distance.

Embodiments of various aspects of the disclosure can include any one or a combination of the following features:
 the concurrent deceleration procedures further comprise:
 processing a gradual deceleration request based on the remaining distance to the coupler position and the velocity of the vehicle at the gradual stopping distance; and controlling the gradual deceleration request by controlling a deceleration of the vehicle based on a first deceleration profile; and controlling the deceleration of the vehicle based on a second deceleration profile in response to each of: the elapsed time reaching a calculated time duration; and the portion of the vehicle passing the rapid stopping distance at the velocity greater than a controlled velocity associated with the first deceleration profile.

According to another aspect of the present disclosure, a vehicle system configured to control a trailer alignment routine is disclosed. The system comprises a hitch mounted on a vehicle, an image sensor configured to capture image data, and a controller. The controller is configured to identify a coupler position of a trailer in the image data and control motion of the vehicle to toward an aligned position. The controller is further configured to monitor a remaining distance to the aligned position based on the image data and calculate a gradual stopping distance based on a velocity of the vehicle. The controller is further configured to control a braking procedure in response to a portion of the vehicle passing the gradual stopping distance and abort the alignment routine in response to the detection of in response to a hitch length being less than a minimum hitch length. The aborting of the alignment routine comprises stopping the vehicle via a rapid deceleration prior to reaching the aligned position.

Embodiments of various aspects of the disclosure can include any one or a combination of a proximity sensor configured to detect a proximity distance to the coupler; and wherein the controller is further configured to: compare the proximity distance to the remaining distance; and in response to a difference between the proximity distance and the remaining distance being greater than an error threshold, abort the alignment routine.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 5A is a plan view of a vehicle approaching a trailer during an alignment procedure;

FIG. 5B is a plan view of a vehicle approaching a trailer during an alignment procedure;

FIG. 6A plot demonstrating a gradual deceleration profile for controlling a braking operation;

FIG. 6B plot demonstrating a rapid deceleration profile for controlling a braking operation;

FIG. 6C plot demonstrating a rapid deceleration profile for controlling a braking operation;

DETAILED DESCRIPTION OF THE PREFERRED EMBODIMENTS

Figure 1:
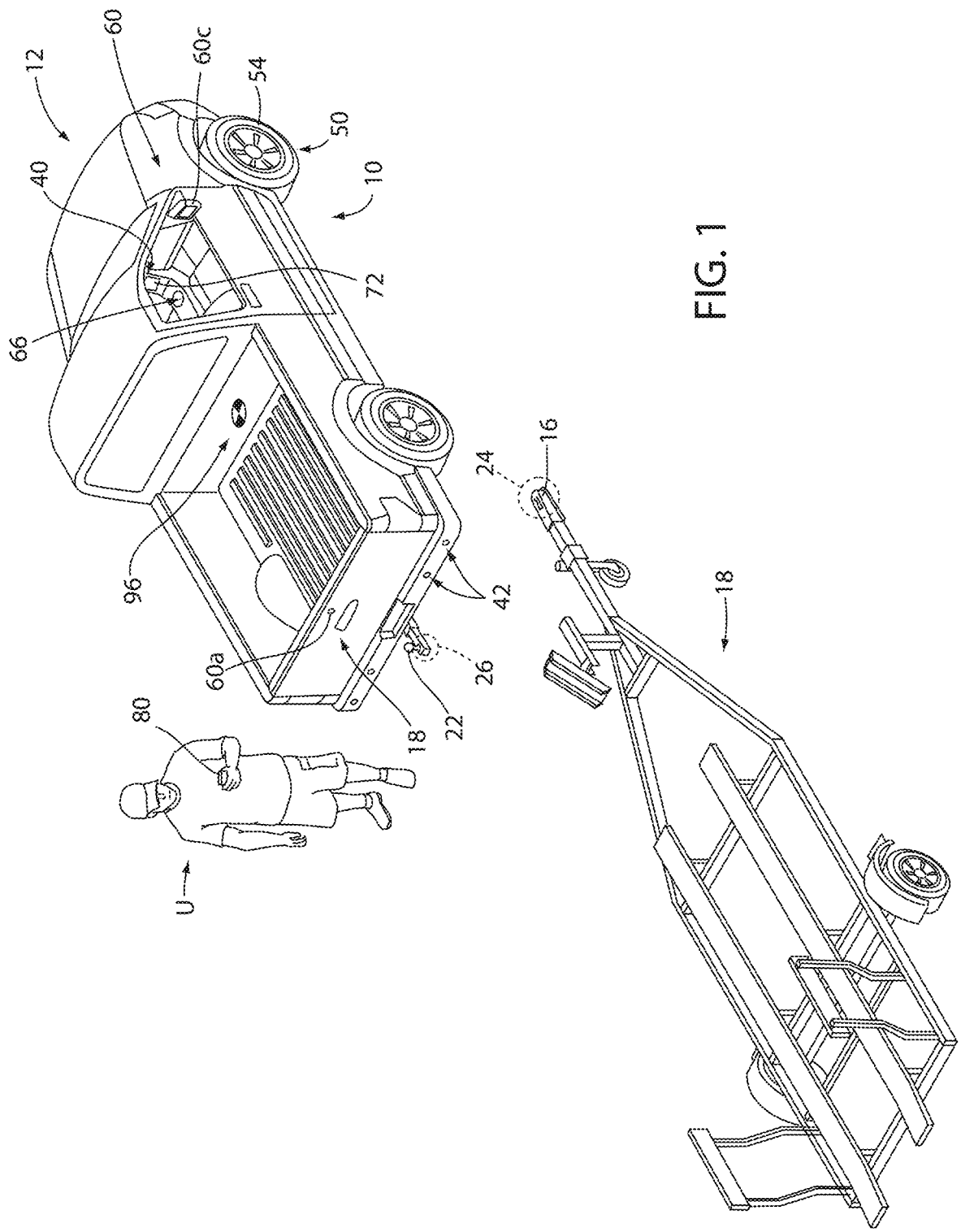
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-4, reference numeral 10 designates a hitch assistance system (also referred to as a "hitch assist" system) for a vehicle 12. In various embodiments, hitch assist system 10 includes a controller 14 configured to acquire position data of a coupler 16 of a trailer 18. The controller 14 may be configured to derive a vehicle path 20 to align a hitch ball 22 of the vehicle 12 with the coupler 16. Deriving the vehicle path 20 may include a variety of steps including detecting and compensating for a change in a coupler position 24 in order to control the vehicle 12 to locate a hitch position 26 aligned with the coupler 16. The vehicle path 20 may comprise a plurality of segments 28, which may correspond to changes in the operating direction or steering direction of the vehicle 12. In various embodiments, deriving the vehicle path 20 may include navigating around intervening objects or structures, operating over uneven terrain, following a desired path indicated by an operator or user U, etc. Accordingly, the disclosure may provide for the hitch assist system 10 to provide for improved navigation of the vehicle 12 and/or interaction with the coupler 16 such that trailer 18 may be effectively connected to the vehicle 12 without complication.

In some embodiments, the system 10 may be configured to identify a stopping threshold based on the position data, which may be derived from one or more sensors in communication with the controller 14. As further discussed in reference to FIGS. 5-9, the stopping threshold may be calculated based on an operating speed or velocity of the vehicle 12 as well as the performance of a brake system of the vehicle, an operating grade, etc. Accordingly, the system 10 may be configured to monitor and control the deceleration and corresponding stopping position of the vehicle 12 based on a plurality of variables and control outputs. In some instances, the deceleration of the vehicle 12 may be independently controlled by a plurality of deceleration procedures to prevent the vehicle 12 from overshooting the coupler position 24. Accordingly, the system may provide for a plurality of deceleration profiles configured to control the motion of the vehicle 12 to accurately align the hitch position 26 with the coupler position 24.

Figure 2:
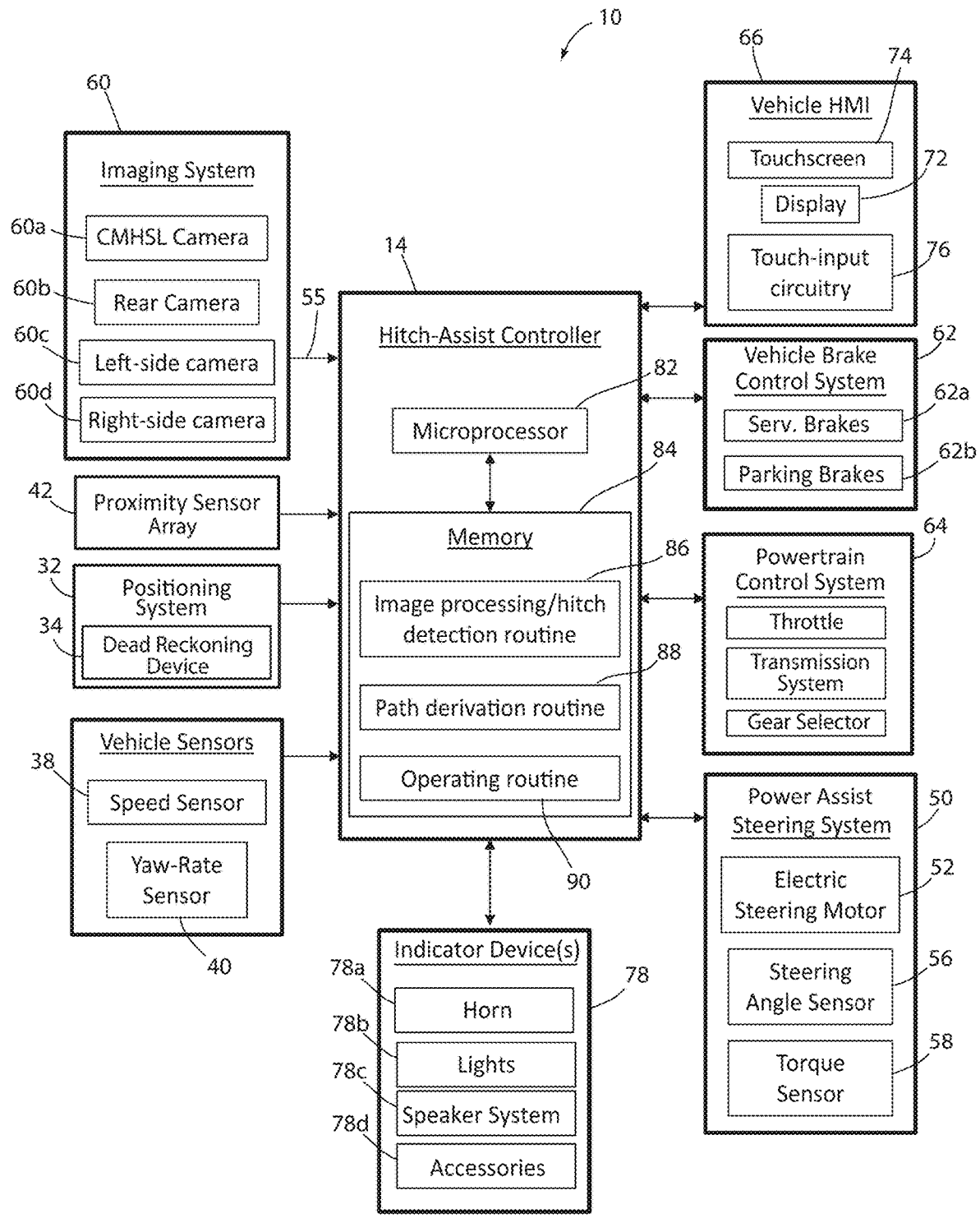
FIG. 2 is a diagram of a system according to an aspect of the disclosure for assisting in aligning the vehicle with a trailer in a position for hitching the trailer to the vehicle.
Figure 3:
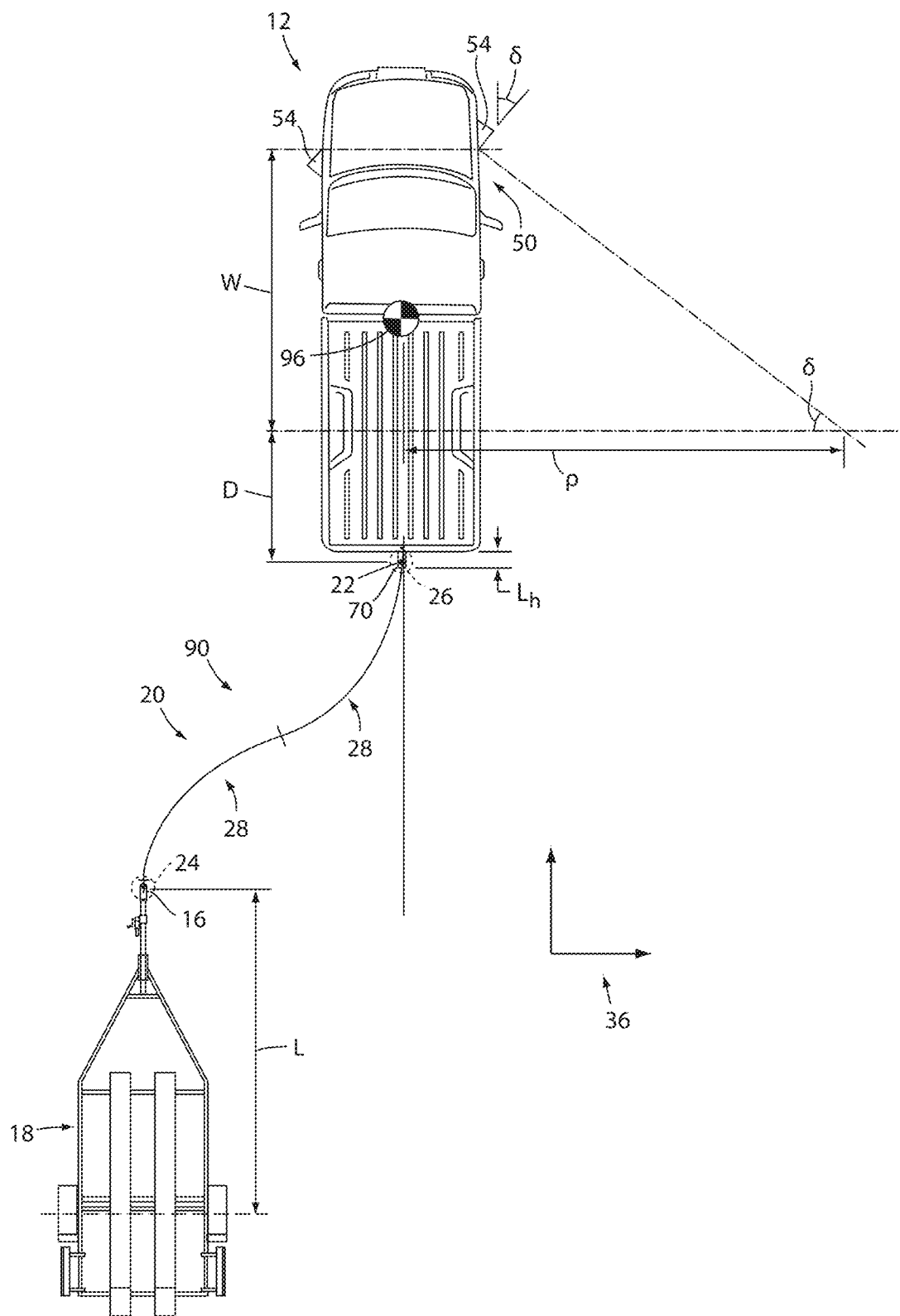
FIG. 3 is a plan view of a vehicle during a step of the alignment sequence with the trailer.
Figure 4:
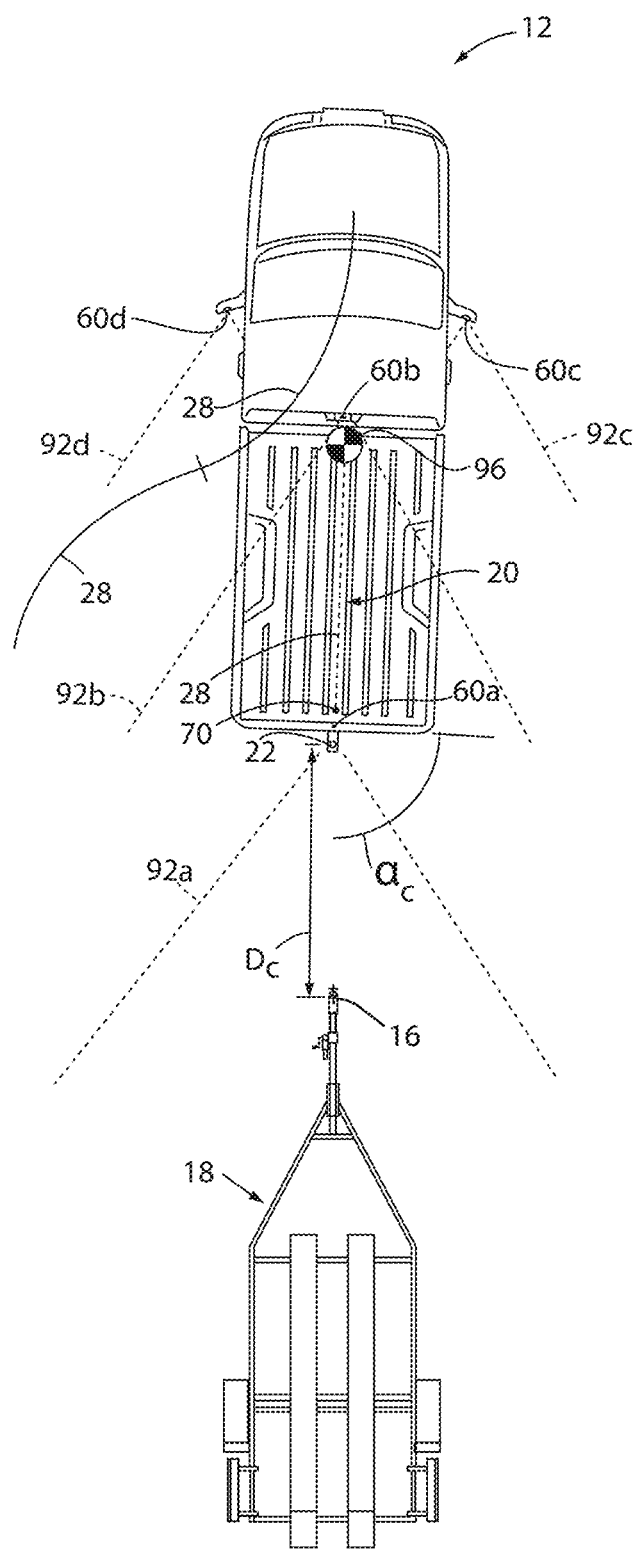
FIG. 4 is a plan view of a vehicle controlling the alignment sequence with the trailer.

With respect to the general operation of the hitch assist system 10, as illustrated in the system diagram of FIGS. 2-4, the system 10 includes various sensors and devices that obtain or otherwise provide vehicle status-related information. This information includes positioning information from a positioning system 32, which may include a dead reckoning device 34 or, in addition or as an alternative, a global positioning system (GPS), to determine a coordinate location of the vehicle 12 based on the one or more locations of the devices within the positioning system 32. In particular, the dead reckoning device 34 can establish and track the coordinate location of the vehicle 12 within a localized coordinate system 36 based at least on vehicle speed and steering angle δ as shown in FIG. 3. Other vehicle information received by hitch assist system 10 may include a speed of the vehicle 12 from a speed sensor 38 and a yaw rate of the vehicle 12 from an inertial measurement unit (IMU) 40. In various embodiments, the IMU 40 may comprise or be in communication with a variety of sensors including but not limited to a gyroscope, an inclinometer, and/or an accelerometer. Additionally, the mass of the vehicle 12 may be measured by one or more weight sensors or pressure sensors in communication with the controller 14. Additionally, it is contemplated that in additional embodiments, a proximity sensor 42 or an array thereof, and other vehicle sensors and devices may provide sensor signals or other information, such as sequential images of the trailer 18, including the detected coupler 16, that the controller 14 of the hitch assist system 10 may process with various routines to determine the height H and position (e.g., based on the distance $D_c$ and angle $α_c$) of coupler 16. As discussed herein, the proximity sensor 42 may correspond to a radar sensor, laser sensor, ultrasonic sensor, inductive, or various sensory devices that may be implemented or incorporated with the vehicle 12. In an exemplary embodiment, the at least one detection sensor may correspond to an image-based detection system (e.g. a camera system), which may comprise a plurality of imaging devices As further shown in FIG. 2, one embodiment of the hitch assist system 10 is in communication with the steering system 50 of vehicle 12. The steering system 50 may be a power-assist steering system 50 including a steering motor 52 to operate the steered wheels 54 (FIG. 1) of the vehicle 12 for moving the vehicle 12 in such a manner that the vehicle yaw changes with the vehicle velocity and the steering angle δ. In the illustrated embodiment, the power-assist steering system 50 is an electric power-assisted steering ("EPAS") system including electric steering motor 52 for turning the steered wheels 54 to a steering angle δ based on a steering command, whereby the steering angle δ may be sensed by a steering angle sensor 56 of the power-assist steering system 50. The steering command may be provided by the hitch assist system 10 for autonomously steering during a trailer hitch alignment maneuver and may alternatively be provided manually via a rotational position (e.g., steering wheel angle) of a steering wheel of vehicle 12.

In the illustrated embodiment, the steering wheel of the vehicle 12 is mechanically coupled with the steered wheels 54 of the vehicle 12, such that the steering wheel moves in concert with steered wheels 54, preventing manual intervention with the steering wheel during autonomous steering. More specifically, a torque sensor 58 is provided on the power-assist steering system 50 that senses torque on the steering wheel that is not expected from autonomous control of the steering wheel and therefore indicative of manual intervention. In this configuration, the hitch assist system 10 may alert the driver to discontinue manual intervention with the steering wheel and/or discontinue autonomous steering. In alternative embodiments, some vehicles have a power-assist steering system 50 that allows a steering wheel to be partially decoupled from the movement of the steered wheels 54 of such a vehicle.

With continued reference to FIG. 2, the power-assist steering system 50 provides the controller 14 of the hitch assist system 10 with information relating to a rotational position of steered wheels 54 of the vehicle 12, including a steering angle δ. The controller 14 in the illustrated embodiment processes the current steering angle, in addition to various vehicle 12 conditions to guide the vehicle 12 along the desired path 20 (FIG. 3). It is conceivable that the hitch assist system 10, in additional embodiments, may be an integrated component of the power-assist steering system 50. For example, the power-assist steering system 50 may include a hitch assist algorithm for generating vehicle steering information and commands as a function of all or a portion of information received from an imaging system 60, the power-assist steering system 50, a vehicle brake control or brake system 62, a powertrain control system 64, and other vehicle sensors and devices, as well as a human-machine interface ("HMI") 66, as discussed further below.

As also illustrated in FIG. 2, the vehicle brake control system 62 may also communicate with the controller 14 to provide the hitch assist system 10 with braking information, such as vehicle wheel speed, and to receive braking commands from the controller 14. The brake control system 62 may be configured to control service brakes 62a and a parking brake 62b. The parking brake 62b may correspond to an electronic parking brake system that may be in communication with the controller 14. Accordingly, in operation, the controller 14 may be configured to control the brakes 62a and 62b as well as detect vehicle speed information, which may be determined from individual wheel speed sensors monitored by the brake control system 62. Vehicle speed may also be determined from the powertrain control system 64, the speed sensor 38, and/or the positioning system 32, among other conceivable means. In some embodiments, individual wheel speeds can also be used to determine a vehicle yaw rate, which can be provided to the hitch assist system 10 in the alternative or in addition to the vehicle IMU 40.

The hitch assist system 10 can further provide vehicle braking information to the brake control system 62 for allowing the hitch assist system 10 to control braking of the vehicle 12 during backing of the trailer 18. For example, the hitch assist system 10, in some embodiments, may regulate speed of the vehicle 12 during alignment of the vehicle 12 with the coupler 16 of trailer 18, which can reduce the potential for a contact with trailer 18 and can bring vehicle 12 to a complete stop at a determined endpoint 70 of the path 20. It is disclosed herein that the hitch assist system 10 can additionally or alternatively issue an alert signal corresponding to a notification of an actual, impending, and/or anticipated contact with a portion of trailer 18. As mentioned above, regulation of the speed of the vehicle 12 may be advantageous to prevent contact with trailer 18.

In some embodiments, the powertrain control system 64, as shown in the embodiment illustrated in FIG. 2, may also interact with the hitch assist system 10 for regulating speed and acceleration of the vehicle 12 during partial or autonomous alignment with trailer 18. During autonomous operation, the powertrain control system 64 may further be utilized and configured to control a throttle as well as a drive gear selection of a transmission of the vehicle 12. Accordingly, in some embodiments, the controller 14 may be configured to control a gear of the transmission system and/or prompt the user U to shift to a desired gear to complete semi-automated operations of the vehicle 12.

As previously discussed, the hitch assist system 10 may communicate with a human-machine interface ("HMI") 66 of the vehicle 12. The HMI 66 may include a vehicle display 72, such as a center-stack mounted navigation or entertainment display (FIG. 1). HMI 66 further includes an input device, which can be implemented by configuring display 72 as a portion of a touchscreen 74 with circuitry 76 to receive an input corresponding with a location over display 72. Other forms of input, including one or more joysticks, digital input pads, or the like, can be used in place or in addition to touchscreen 74. Further, the hitch assist system 10 may communicate via wireless communication with another embodiment of the HMI 66, such as with one or more handheld or portable devices 80 (FIG. 1), including one or more smartphones. The portable device 80 may also include the display 72 for displaying one or more images and other information to a user U. For instance, the portable device 80 may display one or more images of the trailer 18 on the display 72 and may be further configured to receive remote user inputs via touchscreen circuitry 76. In addition, the portable device 80 may provide feedback information, such as visual, audible, and tactile alerts.

In some embodiments, the hitch assist system 10 may further be in communication with one or more indicator devices 78. The indicator devices 78 may correspond to conventional vehicle indicators, such as a vehicle horn 78a, lights 78b, a speaker system 78c, vehicle accessories 78d, etc. In some embodiments, the indicator devices 78 may further include one or more accessories 78d, which may correspond to communication devices, remote controls, and a variety of devices that may provide for status and operational feedback between the user U and the vehicle 12. For example, in some embodiments, the HMI 66, the display 72, and the touchscreen 74 may be controlled by the controller 14 to provide status updates identifying the operation or receiving instructions or feedback to control the hitch assist system 10. Additionally, in some embodiments, the portable device 80 may be in communication with the controller 14 and configured to display or otherwise indicate one or more alerts or messages related to the operation of the hitch assist system 10.

Still referring to the embodiment shown in FIG. 2, the controller 14 is configured with a microprocessor 82 to process logic and routines stored in memory 84 that receive information from the above-described sensors and vehicle systems, including the imaging system 60, the power-assist steering system 50, the vehicle brake control system 62, the powertrain control system 64, and other vehicle sensors and devices. The controller 14 may generate vehicle steering information and commands as a function of all or a portion of the information received. Thereafter, the vehicle steering information and commands may be provided to the power-assist steering system 50 for affecting the steering of the vehicle 12 to achieve a commanded path 20 (FIG. 3) of travel for alignment with the coupler 16 of trailer 18. The controller 14 may include the microprocessor 82 and/or other analog and/or digital circuitry for processing one or more routines. Also, the controller 14 may include the memory 84 for storing one or more routines, including an image processing routine 86 and/or hitch detection routine, a path derivation routine 88, and an operating routine 90.

It should be appreciated that the controller 14 may be a stand-alone dedicated controller or may be a shared controller integrated with other control functions, such as integrated with a vehicle sensor system, the power-assist steering system 50, and other conceivable onboard or off-board vehicle control systems. It should further be appreciated that the image processing routine 86 may be carried out by a dedicated processor, for example, within a stand-alone imaging system for vehicle 12 that can output the results of its image processing to other components and systems of vehicle 12, including microprocessor 82. Further, any system, computer, processor, or the like, that completes image processing functionality, such as that described herein, may be referred to herein as an "image processor" regardless of other functionality it may also implement (including simultaneously with executing image processing routine 86).

System 10 may also incorporate the imaging system 60 that includes one or more exterior cameras. Examples of exterior cameras are illustrated in FIG. 4 and include rear camera 60a, center high-mount stop light (CHMSL) camera 60b, and side-view cameras 60c and 60d, although other arrangements including additional or alternative cameras are possible. In one example, imaging system 60 can include rear camera 60a alone or can be configured such that system 10 utilizes only rear camera 60a in a vehicle with multiple exterior cameras. In another example, the various cameras 60a-60d included in imaging system 60 can be positioned to generally overlap in their respective fields of view, which in the depicted arrangement include fields of view 92a, 92b, 92c, and 92d to correspond with rear camera 60a, center high-mount stop light (CHMSL) camera 60b, and side-view cameras 60c and 60d, respectively. In this manner, image data from two or more of the cameras can be combined in image processing routine 86, or in another dedicated image processor within imaging system 60, into a single image.

As an example of combining image data from multiple cameras, the image data can be used to derive stereoscopic image data that can be used to reconstruct a three-dimensional scene of the area or areas within overlapped areas of the various fields of view 92a, 92b, 92c, and 92d, including any objects (obstacles or coupler 16, for example) therein. In an embodiment, the use of two images including the same object can be used to determine a location of the object relative to the two image sources, given a known spatial relationship between the image sources. In this respect, the image processing routine 86 can use known programming and/or functionality to identify an object within image data from the various cameras 60a, 60b, 60c, and 60d within imaging system 60. In either example, the image processing routine 86 can include information related to the positioning of any cameras 60a, 60b, 60c, and 60d present on vehicle 12 or utilized by system 10, including relative to a center 96 (FIG. 1) of vehicle 12, for example, such that the positions of cameras 60a, 60b, 60c, and 60d relative to center 96 and/or to each other can be used for object positioning calculations and to result in object position data relative to the center 96 of vehicle 12, for example, or other features of vehicle 12, such as hitch ball 22 (FIG. 1), with known positions relative to center 96 of the vehicle 12.

The image processing routine 86 can be specifically programmed or otherwise configured to locate coupler 16 within image data. In one example, the image processing routine 86 can identify the coupler 16 within the image data based on stored or otherwise known visual characteristics of coupler 16 or hitches in general. In another embodiment, a marker in the form of a sticker, or the like, may be affixed with trailer 18 in a specified position relative to coupler 16 in a manner similar to that which is described in commonly-assigned U.S. Pat. No. 9,102,271, the entire disclosure of which is incorporated by reference herein. In such an embodiment, the image processing routine 86 may be programmed with identifying characteristics of the marker for location in image data, as well as the positioning of coupler 16 relative to such a marker so that the position 24 of the coupler 16 can be determined based on the marker location.

Additionally or alternatively, controller 14 may seek confirmation of the determined coupler 16, via a prompt on touchscreen 74. If the coupler 16 determination is not confirmed, further image processing may be provided, or user-adjustment of the position 24 of coupler 16 may be facilitated, either using touchscreen 74 or another input to allow the user U to move the depicted position 24 of coupler 16 on touchscreen 74, which controller 14 uses to adjust the determination of position 24 of coupler 16 with respect to vehicle 12 based on the above-described use of image data. Alternatively, the user U can visually determine the position 24 of coupler 16 within an image presented on HMI 66 and can provide a touch input in a manner similar to that which is described in commonly-assigned U.S. Pat. No. 10,266,023, the entire disclosure of which is incorporated by reference herein. The image processing routine 86 can then correlate the location of the touch input with the coordinate system 36 applied to image data shown on the display 72, which may be depicted as shown in FIG. 3.

As shown in FIG. 3, the image processing routine 86 and operating routine 90 may be used in conjunction with each other to determine the path 20 along which hitch assist system 10 can guide vehicle 12 to align hitch ball 22 and coupler 16 of trailer 18. In the example shown, an initial position of vehicle 12 relative to trailer 18 may be such that coupler 16 is only in the field of view 92c of side camera 60c, with vehicle 12 being positioned laterally from trailer 18 but with coupler 16 being almost longitudinally aligned with hitch ball 22. In this manner, upon initiation of hitch assist system 10, such as by user input on touchscreen 74, for example, image processing routine 86 can identify coupler 16 within the image data of camera 60c and estimate the position 24 of coupler 16 relative to hitch ball 22. The position 24 of the coupler 16 may be identified by the system 10 using the image data in accordance by receiving focal length information within image data to determine a distance $D_c$ to coupler 16 and an angle $\alpha_c$ of offset between coupler 16 and the longitudinal axis of vehicle 12. This information may also be used in light of the position 24 of coupler 16 within the field of view of the image data to determine or estimate the height $H_c$ of coupler 16. Once the positioning $D_c$, $\alpha_c$ of coupler 16 has been determined and, optionally, confirmed by the user U, the controller 14 can take control of at least the vehicle steering system 50 to control the movement of vehicle 12 along the desired path 20 to align the hitch ball position 26 of the vehicle hitch ball 22 with coupler 16.

Continuing with reference to FIGS. 3 and 4 with additional reference to FIG. 2, controller 14, having estimated the positioning $D_c$, $\alpha_c$ of coupler 16, as discussed above, can, in one example, execute path derivation routine 88 to determine vehicle path 20 to align the vehicle hitch ball 22 with coupler 16. In particular, controller 14 can have stored in memory 84 various characteristics of vehicle 12, including the wheelbase W, the distance from the rear axle to the hitch ball 22, which is referred to herein as the drawbar length L, as well as the maximum angle to which the steered wheels 54 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan\delta} \quad (1)$$

in which the wheelbase W is fixed and the steering angle $\delta$ can be controlled by controller 14 by communication with the steering system 50, as discussed above. In this manner, when the maximum steering angle $\delta_{max}$ is known, the smallest possible value for the turning radius $\rho_{min}$ is determined as:

$$\rho_{min} = \frac{1}{W \tan\delta_{max}} \quad (2)$$

Path derivation routine 88 can be programmed to derive vehicle path 20 to align a known location of the vehicle hitch ball 22 with the estimated position 24 of coupler 16 that takes into account the determined minimum turning radius $\rho_{min}$ to allow path 20 to use the minimum amount of space and maneuvers. In this manner, path derivation routine 88 can use the position of vehicle 12, which can be based on the center 96 of vehicle 12, a location along the rear axle, the location of the dead reckoning device 34, or another known location on the coordinate system 36, to determine both a lateral distance to the coupler 16 and a forward or rearward distance to coupler 16 and derive a path 20 that achieves the needed lateral and forward-backward movement of vehicle 12 within the limitations of steering system 50. The derivation of path 20 further takes into account the positioning of hitch ball 22, based on length L, relative to the tracked location of vehicle 12 (which may correspond with the center 96 of mass of vehicle 12, the location of a GPS receiver, or another specified, known area) to determine the needed positioning of vehicle 12 to align hitch ball 22 with coupler 16.

Referring now to FIGS. 5A and 5B, top plan views of the vehicle 12 are shown demonstrating a guidance routine configured to align the hitch ball 22 with coupler 16. As illustrated, the controller 14 may be configured to maneuver the vehicle 12 in reverse along a heading direction 102, which may be identified based on the path 20 determined via the path derivation routine 88. As previously discussed, the controller 14 may be configured to control the brake control system 62 to control the approach of the vehicle 12 at the endpoint 70 of the path 20. In order to ensure that the vehicle 12 is accurately stopped at the endpoint 70, the controller 14 may further determine the boundary region 30 based on the stopping distance of the vehicle 12. In this way, the system 10 may control the vehicle 12 to accurately align the hitch ball 22 with the coupler 16 in a variety of approach angles while preventing contact between the vehicle 12 and the trailer 18.

In FIG. 5A, the vehicle 12 is shown at a first distance $d_1$, and, in FIG. 5B, the vehicle 12 is shown at a second distance $d_2$ relative to the coupler position 24. As the vehicle 12 approaches the trailer 18, the controller 14 may decrease the vehicle speed to an approach speed. The approach speed of the vehicle 12 may provide for a stopping distance $d_s$ of the vehicle to be consistently controlled by the system. For example, the stopping distance $d_s$ of the vehicle 12 may be calculated based on various control parameters of the brake control system 62 and/or calibrated by sample data captured by the system 10 during one or more trial measurements. The calculation of the stopping distance $d_s$ may be calculated as a function of the velocity of the vehicle 12, the performance of the brake system 62, a surface gradient or angle of the surface on which the vehicle 12 is operating and the mass of the vehicle 12. In order to provide for the surface gradient, the controller 14 may be in communication with an inertial measurement unit (IMU), a gyroscope, an inclinometer, and/or an accelerometer. Additionally, the mass of the vehicle 12 may be measured by one or more weight sensors or pressure sensors in communication with the controller 14. In this way, the system 10 may be configured to calculate and/or determine the stopping distance $d_s$.

In some embodiments, the stopping distance $d_s$ may be calibrated based on a desired deceleration rate or predetermined deceleration profile of the vehicle 12. The calibration may be based on the surface gradient, the mass of the vehicle 12, etc. as previously discussed. Additionally, the deceleration profile and corresponding stopping distance $d_s$ may be adjusted and calibrated to suit a comfort condition or desired time required to complete an alignment routine. For example, an increased deceleration rate may reduce comfort, but may improve a time necessary to complete the alignment routine by allowing for increased operating speeds and/or a reduced stopping distance $d_s$. In contrast, a low deceleration rate may result in a smoother stoppage of the vehicle 12 but may ether increase an alignment time or increase the stopping distance $d_s$. Accordingly, the operation of the system 10 may be calibrated to suit the desired rate of deceleration and additional variables that may be associated with the rate of deceleration as discussed herein.

Based on the stopping distance $d_s$, the controller 14 may calculate the boundary region 30 extending from a perimeter 106 of the trailer 18. The perimeter 106 of the trailer 18 may be detected in the scanning data as a perimeter edge of the trailer 18 is identified in image data and/or proximity data captured by the imaging system 60 or various additional scanning devices (e.g. ultrasonic sensors, radar sensors, etc.). In some embodiments, the controller 14 may calculate a coupler boundary 30a based on the perimeter 106 of the coupler 16. The coupler boundary 30a which may correspond to a semicircle positioned concentrically about the coupler position 24. Additionally, the boundary region 30 may comprise a trailer boundary 30b, which may extend substantially perpendicular to the heading direction 102 through the coupler position 24. In this way, the boundary region 30 may vary based on an approach angle between the heading direction 102 of the vehicle 12 and a coupler trajectory 104, which may be substantially aligned with a centerline C of the trailer 18.

Referring still to FIGS. 5A and 5B, in response to a portion of the vehicle 12 entering or crossing a perimeter of the boundary region 30, the controller 14 may control the brake system 62 to stop the vehicle 12. As shown in FIG. 5B, the controller 14 may activate the braking routine in response to the hitch ball 22 entering the boundary region 30 such that the vehicle 12 is accurately stopped with that the hitch ball 22 is aligned with the coupler 16. In order to provide for the alignment as shown in FIGS. 5A and 5B, the controller 14 may calculate the path derivation routine 88 such that the heading direction 102 of the vehicle 12 and a coupler trajectory 104 are substantially aligned with a centerline C when the vehicle 12 enters the boundary region 30.

Referring now to FIGS. 6A, 6B, and 6C; plots are shown demonstrating a velocity and position of the vehicle 12 relative to the coupler position 24 or an aligned position 112 for the hitch ball 22 when the vehicle 12 is stopped. As previously discussed, the system 10 may be configured to monitor and control the deceleration and corresponding stopping position of the vehicle 12 based on a plurality of variables and control outputs. In general, the stopping routines or procedures of the vehicle 12 may be applied by the controller 14 concurrently in order to ensure that the vehicle 12 is stopped in the aligned position 112 and importantly does not overshoot the aligned position and contact the trailer 18. Accordingly, the system 10 may provide for a plurality of deceleration profiles configured to control the motion of the vehicle 12 to accurately align the hitch position 26 with the coupler position 24.

As demonstrated in FIG. 6A, the controller 14 may be configured to calculate a gradual stopping distance 114, which may be dependent on various control parameters of the brake control system 62 and/or calibrated by sample data captured by the system 10 during one or more trial measurements. Similarly, as demonstrated in FIGS. 6B and 6C, the controller 14 may be configured to calculate a rapid stopping distance 116. The gradual stopping distance 114 may be calculated based on a first deceleration profile 118 and the rapid stopping distance 116 calculated based on a second deceleration profile 120. The second deceleration profile 120 may comprise a second rate 124 of average deceleration that is greater or increased relative to a first rate 122 of average deceleration of the first deceleration profile 118 over the corresponding stopping distances 114 and 116.

In some implementations, the second deceleration profile 120 may be configured to bring the vehicle 12 to a stop as quickly as possible based on the performance of the brake system 62, the weight of the vehicle 12, the grade or angle of the operating surface, and additional variables that may affect the stopping distance $d_s$ of the vehicle 12. Accordingly, the controller 14 may be configured to control the deceleration of the vehicle 12 to stop gradually via the first deceleration profile 118 or rapidly via the second deceleration profile 120. In some instances, the gradual slowing of the vehicle 12 via the first deceleration profile 118 may be applied for a planned deceleration while the rapid stopping of the vehicle 12 via the second deceleration profile 120 may be applied as a rapid halt or secondary stopping procedure. For example, the controller 14 may apply or selectively activate the brake system 62 to stop the vehicle 12 via second deceleration profile in order to prevent an overshoot that may result from a miscalculation or error resulting during the gradual deceleration of the first deceleration profile 118.

Still referring to FIGS. 6A, 6B, and 6C, the controller 14 may apply the second deceleration profile 120 in instances where the velocity of the vehicle 12 not slowed according to the first deceleration profile 118. For example, during a braking operation, the controller 14 may control the brake system 62 to control the velocity of the vehicle 12 to decelerate in response to a gradual deceleration command 126 according to the first deceleration profile 118. As previously discussed, the controller 14 may be configured to calculate the gradual stopping distance 114 of the vehicle 12 based on the first deceleration profile 118, the velocity of the vehicle 12 and the various braking parameters or performance characteristics as discussed herein. However, if an error occurs in the application of the first deceleration profile 118 in attempting to decrease the velocity, the controller 14 may control the brake system 62 to stop the vehicle 12 accordingly to the second deceleration profile 120 to prevent the vehicle 12 from overshooting or passing the coupler position 24 or the aligned position 112. Examples of applications of the controller 14 controlling the brake system 62 via the second deceleration profile 120 are shown in FIGS. 6B and 6C. As shown, the position of the vehicle 12 passes the gradual stopping distance 114 and in each example, the second deceleration profile 120 is applied at the rapid stopping distance 116. Accordingly, the controller 14 may control the brake system 62 based either of the deceleration profiles 118, 120 to suit a variety of operating conditions, examples of which are introduced in FIGS. 7 and 8.

Figure 7:
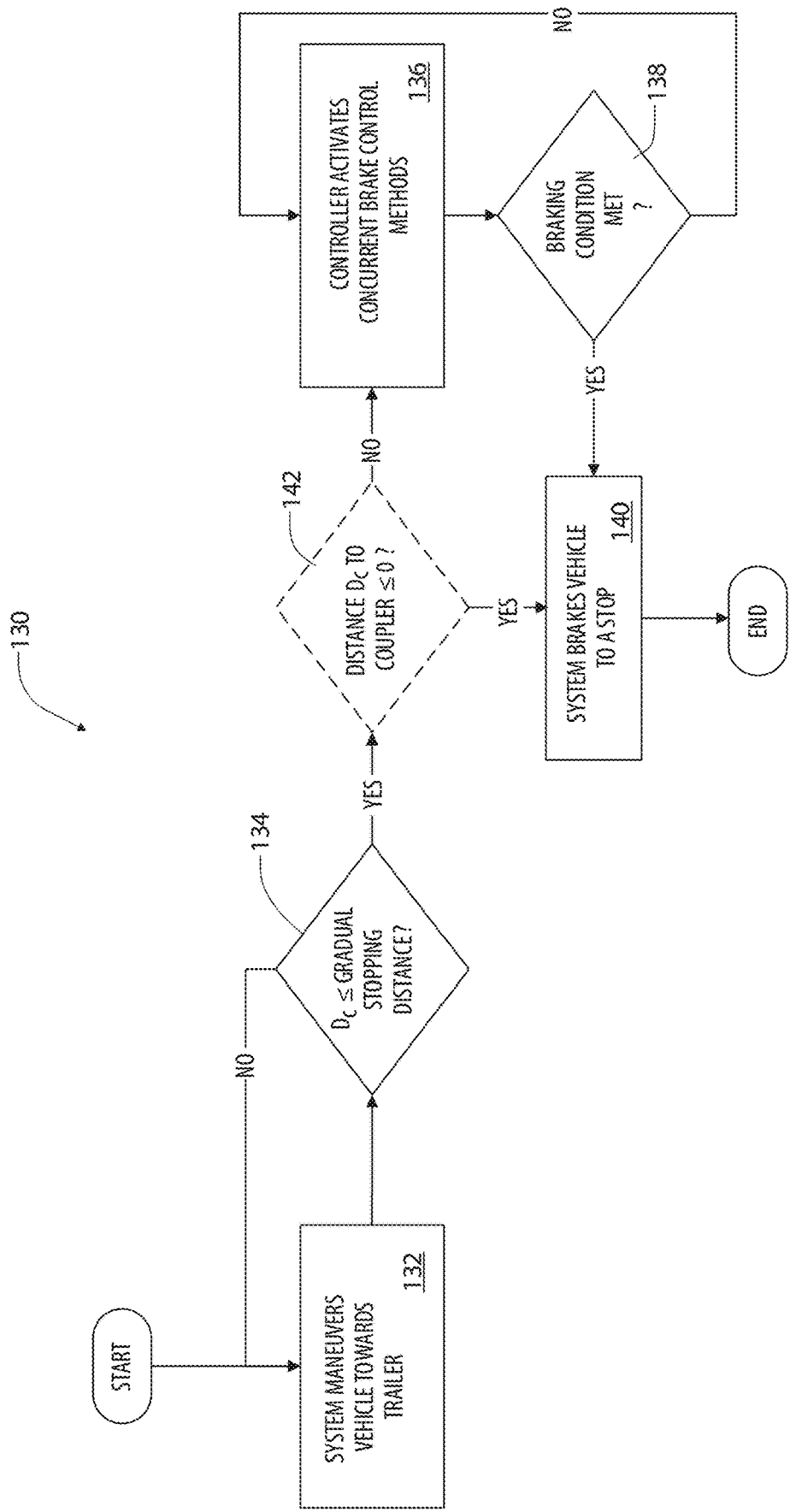
FIG. 7 is a flow chart demonstrating a method for controlling a braking operation of a vehicle as part of an alignment between a vehicle hitch and a coupler of a trailer.

Referring now to FIG. 7, a flow chart is shown demonstrating a method 130 for controlling the braking operation of the vehicle 12 as part of an alignment between the hitch ball 22 and the coupler 16. Beginning with step 132, the method 130 may begin with the controller 14 by maneuvering the hitch ball 22 of the vehicle 12 to the coupler position 24 by controlling the power-assist steering system 50, the vehicle brake control system 62, and the powertrain control system 64 as discussed herein. A previously discussed, the coupler position 24 may be identified based on the image data and/or proximity data captured by the imaging system 60 or various additional scanning devices. Throughout the navigation of the hitch ball 22 of the vehicle 12 toward the coupler position 24, the controller 14 may monitor the velocity of the vehicle 12 and calculate the gradual stopping distance 114. With the gradual stopping distance 114, the controller 14 may compare the distance $D_c$ to coupler 16 to the gradual stopping distance 114 (134). If the distance $D_c$ to the coupler 16 is less than or equal to the gradual stopping distance 114, the controller 14 may control the system to decelerate or stop the vehicle 12 by a plurality of concurrent brake control methods, which are further discussed in reference to FIG. 8 (136).

In step 138, the controller 14 may be configured to monitor the conditions and control inputs utilized to control each of the concurrent braking conditions and identify if one or more of the braking conditions are met. If one or more of the braking conditions are met, the controller 14 may proceed to step 140 to control the brake system 62 to stop the vehicle 12. As further discussed in reference to FIG. 8, if one multiple concurrent braking instructions are identified, the controller 14 may control the brake system 62 to control the deceleration of the vehicle 12 based on the maximum deceleration rate instructed. For example, if a braking instruction according to the first deceleration profile 118 is requested concurrently with a braking instruction according to the second deceleration profile 120, the controller 14 may control the brake system 62 to decelerate the vehicle via the second deceleration profile 120. In this way, the controller 14 may resolve conflicting control instructions by stopping the vehicle 12 short of the coupler position 24 rather than overshooting the coupler position 24. Finally, as demonstrated in step 142, the controller 14 may be configured to monitor the distance $D_c$ to the coupler 16. If the distance is less than or equal to zero, the controller 14 may control the brake control system 62 to stop the vehicle abruptly. Though some of the brake control parameters and instructions discussed in reference to the method 130 may seem redundant, the repeated nature of the operations may provide for a reduced likelihood of overshooting the coupler position 24 as a result of a detection or processing error, a network delay or interruption in the operation of the controller 14 and/or the brake control system 62, and for various errors to the various sensors and control elements discussed herein and primarily introduced in reference to FIG. 2.

Figure 8:
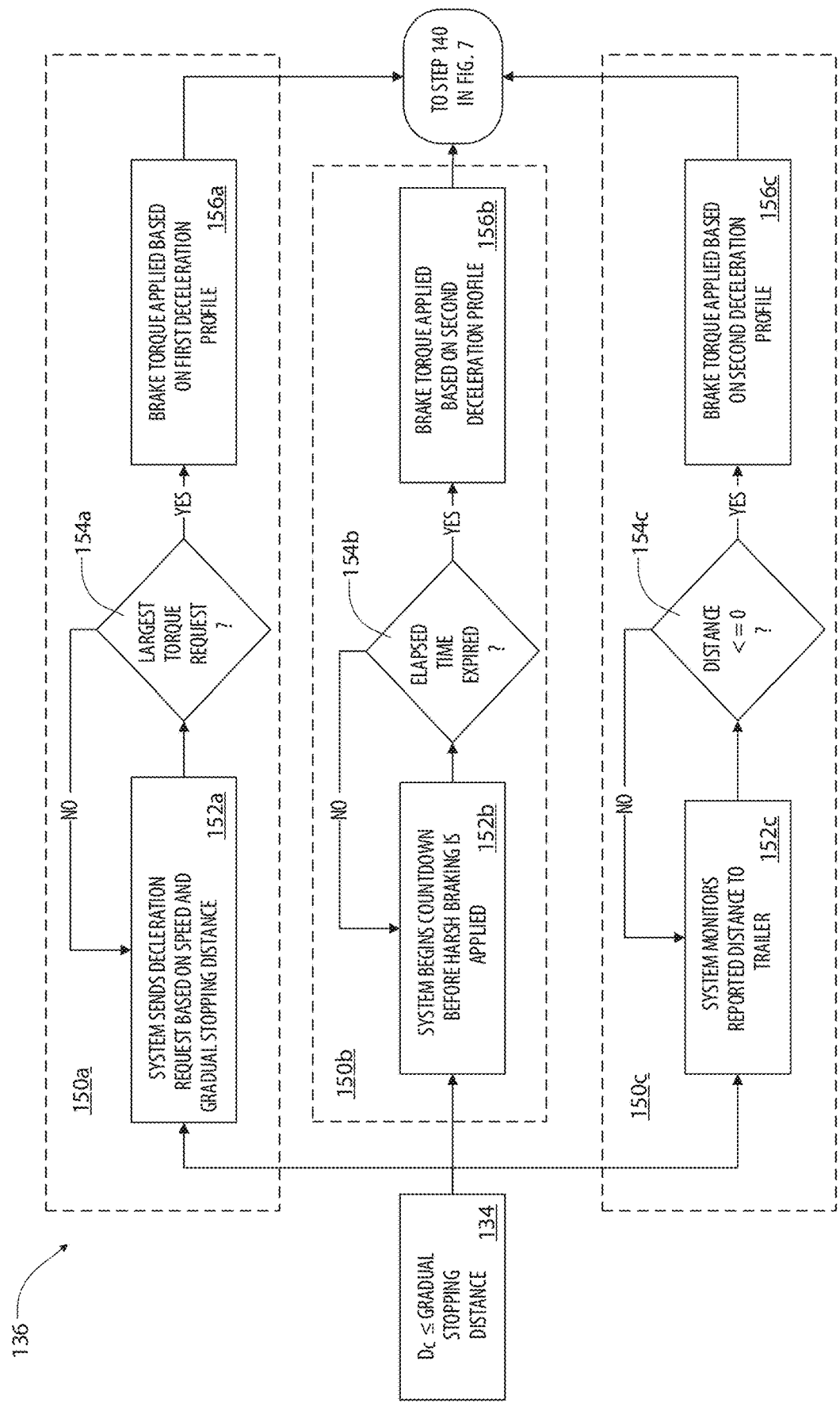
FIG. 8 is a flow chart demonstrating a method for controlling braking operation comprising a plurality of concurrent operations configured to accurately control a stopping position of a vehicle.

Referring now to FIG. 8, the concurrent brake control methods introduced in step 136 of FIG. 7 are discussed in further detail. For convenience of reference, the concurrent brake control methods may be referred to as a first brake control method 150a, a second brake control method 150b, and a third brake control method 150c. In the first control method 150a, the controller 14 may initiate a deceleration request to the brake system 62 in response to the distance $D_c$ to the coupler 16 less than or equal to the gradual stopping distance 114. In some implementations, the controller 14 may alternatively send a brake torque request to the brake system 62. In either case, the brake control request may be calculated and/or previously calibrated to accurately stop the vehicle over the gradual stopping distance 114.

As previously discussed, the deceleration request from the controller 14 to the brake system 62 may be based on the velocity of the vehicle 12 and the distance to the coupler 16 of the trailer 18. For example, the stopping distance $d_s$ of the vehicle 12 may be calculated according to equation (3) as follows:

$$d_s = \frac{v^2}{2\,\mu g} \quad (3)$$

in which v is the velocity of the vehicle, $\mu$ is the ground friction coefficient, and g is the gravitational acceleration. Based on the calculation, the stopping distance $d_s$ of the vehicle 12 may be calculated by setting $\mu g$ as the desired deceleration according to equation (4) as follows:

$$\text{Deceleration} = \frac{v^2}{2\,d_s} \quad (4)$$

where $\mu g$ becomes the desired deceleration. Accordingly, the controller 14 may control the brake system 62 to control the deceleration of the vehicle 12 in accordance with the first deceleration profile 118 based on equation 4 in step 152a.

In step 154a, the controller 14 may compare the deceleration request in step 152a to any additional or conflicting requests. If another deceleration request exceeds the deceleration rate in step 152a, the controller 14 may activate the deceleration request comprising the greatest rate of deceleration of the vehicle 12. For example, if a deceleration request based on the second deceleration profile 120 were to be initiated at the same time as the deceleration request in step 152a based on the first deceleration profile 118, the controller 14 would automatically select the request with the highest rate of deceleration by applying the request based on the second deceleration profile 120. In step 156a, if another deceleration or brake torque control request does not exceed the rate or brake torque instructed in step 152a, the controller 14 may continue to control the stopping of the vehicle based on the first deceleration profile 118.

Concurrent to the first brake control method 150a, the controller 14 may activate a countdown timer in step 152b as part of the second brake control method 150b. Similar to step 152a, the controller 14 may initiate step 152b in response to the distance $D_c$ to the coupler 16 being less than or equal to the gradual stopping distance 114. The duration of the countdown timer may be calculated or programmed based on an expected time necessary to stop the vehicle 12 via the first deceleration profile 118. After the timer has begun, the controller 14 may compare an elapsed time of the timer to the expected time of the deceleration of the vehicle 12 in step 154b. In response to the expected time expiring or having elapsed, the controller 14 may control the brake control system 62 to apply a brake torque or deceleration based on the second deceleration profile 120 (156*b*). As previously discussed, the second deceleration profile 120 may correspond to a maximum rate of deceleration of the vehicle 12 and therefore may supersede and interrupt the control instructions associated with the first brake control method 150*a* as discussed in reference to step 154*a*.

Additionally, the controller 14 may be configured to control the brake system 62 based on the third brake control method 150*c* concurrent to the first method 150*a* and the second method 150*b*. Though the methods are discussed together in a specific combination, each of the methods 150*a*, 150*b*, and/or 150*c* may be implemented in various combinations without departing from the spirit of the disclosure. In step 152*c*, the controller may continue to monitor the distance $D_c$ to the coupler 16 as previously discussed in reference to step 142. By monitoring the distance $D_c$ to the coupler 16, the controller 14 may identify if the distance $D_c$ to the coupler 16 is less than or equal to zero in step 154*c*. In response to the distance $D_c$ to the coupler 16 less than or equal to zero, the controller 14 may instruct the brake control system 62 to apply a brake torque or deceleration based on the second deceleration profile 120 (156*c*). As previously discussed, the second deceleration profile 120 may supersede and interrupt the control instructions associated with the first brake control method 150*a* as discussed in reference to step 154*a*. Following steps 156*a*, 156*b*, 156*c*, the method 130 may continue to step 140 as previously discussed in reference to FIG. 7.

Figure 9A:
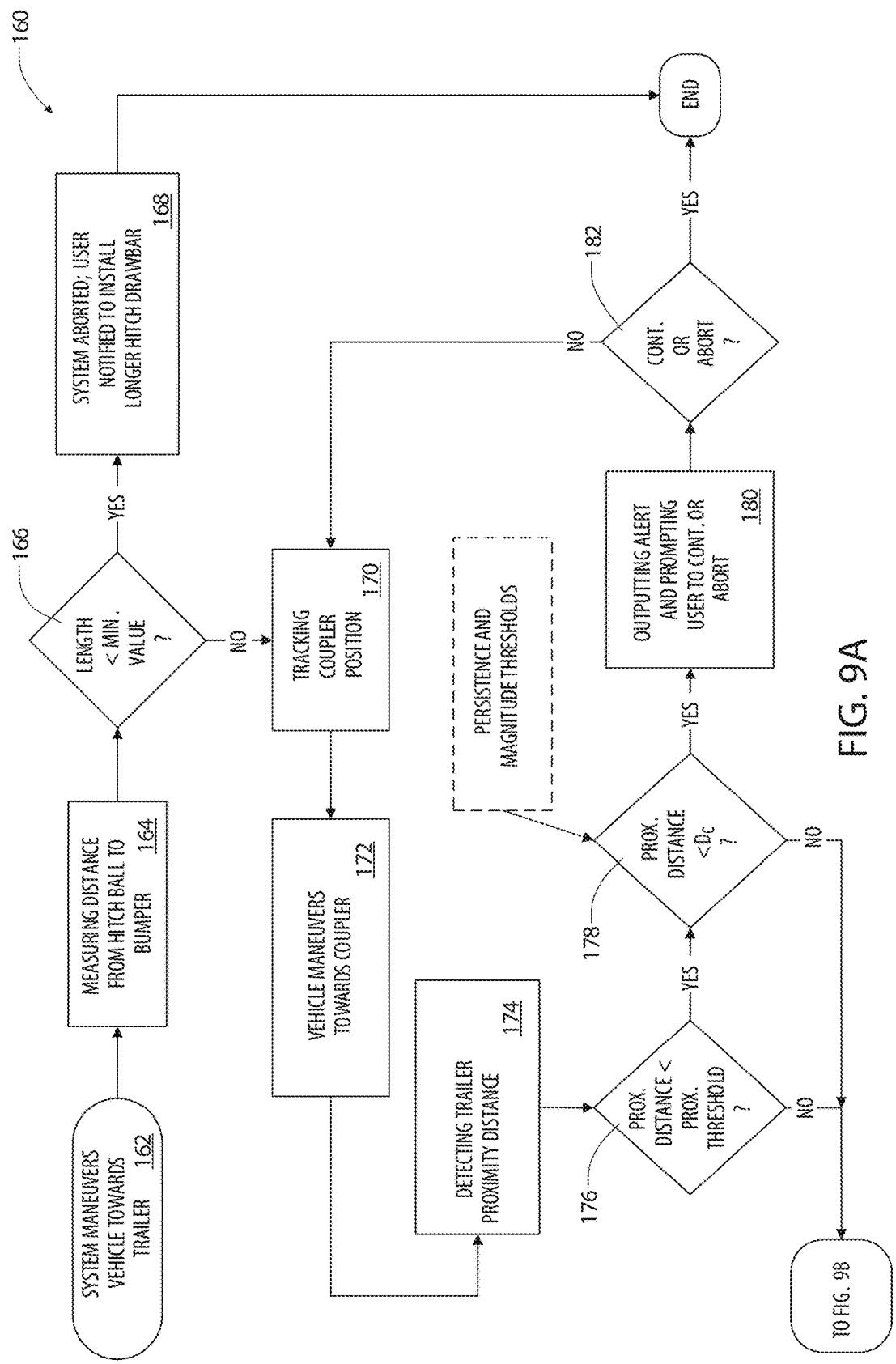
FIG. 9A is a flow chart demonstrating a method for controlling braking operation.
Figure 9B:
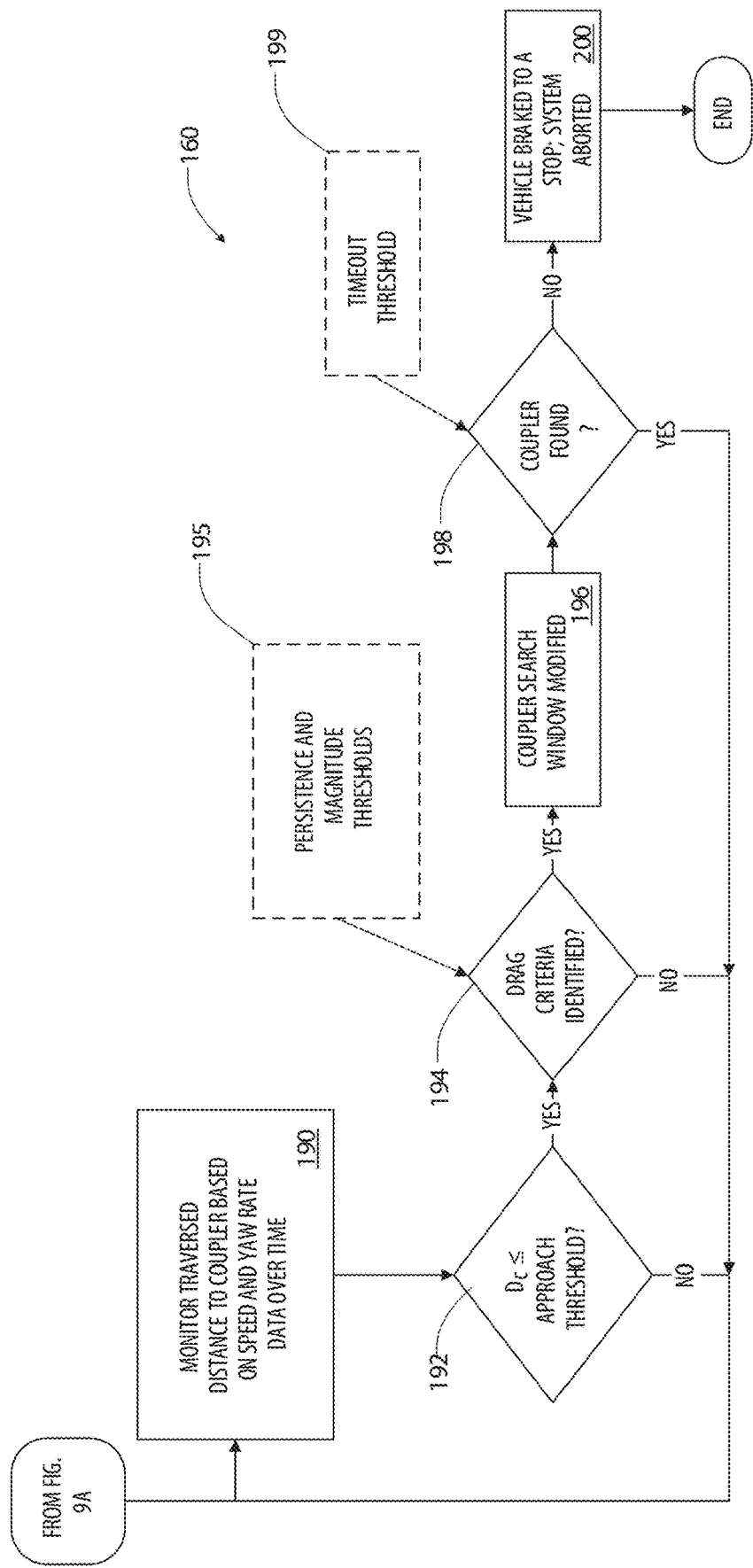
FIG. 9B is a flow chart demonstrating a method for controlling braking operation in accordance with the disclosure.

Referring now to FIGS. 9A and 9B, a flow chart is shown demonstrating a method 160 for controlling a braking operation of the vehicle 12. Similar to or in conjunction with the method 130, the method 160 may begin with the controller 14 by maneuvering the hitch ball 22 of the vehicle 12 to the coupler position 24 by controlling the power-assist steering system 50, the vehicle brake control system 62, and the powertrain control system 64 (162). A previously discussed, the coupler position 24 may be identified based on the image data and/or proximity data captured by the imaging system 60 or various additional scanning devices. Additionally, the hitch position 26 of the hitch ball 22 may be identified via the image and/or proximity data. For example, the imaging system 60 may detect the hitch position 26 based on a conversion of a pixel count to a real-world distance in the approximate height of the hitch ball in the field of view of the camera 60*a*/60*b*. Accordingly, in step 164, the controller 14 may compare the hitch position 26 in a field of view of a camera 60*a*/60*b* of the imaging system 60 to identify a hitch length $L_h$ as shown in FIG. 3.

Next, in step 166, the controller 14 may compare the hitch length $L_h$ to a minimum or predetermined hitch length that may be stored in the memory 84. If the measured or detected hitch length $L_h$ is less than the minimum hitch length, the controller 14 may abort the alignment operation and notify the user U of the system 10 (e.g. via to the HMI 66) that the hitch length $L_h$ is less than a minimum requirement (168). By detecting the hitch length $L_h$, the controller 14 may ensure that the distance between the hitch ball 22 and the bumper or nearest portion of the vehicle 12 is outside an alignment error region that may result due to system limitations and potential errors in tracking the coupler position 24. In this way, the system 10 may prevent a minor overshoot in the alignment from resulting in damage to the vehicle 12.

Following step 166, if the hitch length $L_h$ is greater than the minimum hitch length, the method 160 may continue to step 170 and continue tracking the coupler position 24.

Additionally, the navigation of the vehicle 12 toward the trailer 18 may continue in step 172. While maneuvering toward the trailer 18, the controller 14 may additionally activate the proximity sensor 42 in order to detect a proximity distance of the nearest portion of the trailer 18 along the path 20 (174). Based on the proximity distance, the controller 14 may process and monitor a comparison of the proximity distance to a minimum distance threshold in step 176. Additionally or alternatively, the controller 14 may also process and monitor a comparison of the proximity distance to the distance $D_c$ to the coupler 16 (178). In either of steps 176 and/or 178, if the proximity distance is greater than the minimum proximity threshold or the distance $D_c$, the controller may pause the alignment routine and output an indication of the error to the HMI 66 in step 180. Based on the indication of the error, the HMI may prompt the user U to manually verify whether to continue the alignment routine or abort the routine in step 182. In response to an input selecting an abort option, the controller 14 may end the routine. In response to an input selecting the continue option, the controller 14 return to step 170 to continue to track the coupler position 24 and maneuver the hitch ball 22 toward the coupler 16.

Continuing now to FIG. 9B, the method 160 may additionally monitor a traversed distance of the vehicle 12 based on the dynamic motion data identified by one or more sensors of the vehicle 12. The controller 14 may monitor the progress of the traversed or traveled distance of the vehicle 12 throughout the operation. Additionally, in step 192, the controller 14 may compare the distance $D_c$ to the coupler 16 to an approach threshold. For example, in response to detecting that the distance $D_c$ to the coupler 16 is less than or equal to the approach threshold or a buffered distance (e.g. a distance between 0.1 m and 2 m), the controller 14 may monitor the motion data of the vehicle 12 in comparison to a detected change in the coupler position 24 to identify a drag criteria. By monitoring the drag criteria, the controller 14 may be configured to detect a movement of the coupler position 24 that may result due to the gradual motion of a shadow of the vehicle 12 or the trailer 18 in the image data. In this way, the controller 14 may detect an error in the identified coupler position 24 as a result of the drag or movement of the vehicle 12.

Still referring to step 194, the error condition associated with the drag or movement of the coupler position 24 in the image data may be detected by the controller 14 based comparisons of the relative motion of the coupler position 24 in relation to the traversed distance. For example, if the motion of the coupler position 24 correlates sufficiently to the change in the position of the vehicle 12 identified based on the GPS location, the velocity, acceleration, and/or steering angle δ, the controller may identify that one or more drag criteria for the coupler position 24 are identified. The sufficiency of the correlation between the movement of the vehicle 12 and the movement of the coupler position 24 may be identified in step 194 by comparing the magnitude and corresponding time or persistence of the movement of the vehicle 12 and the coupler position 24 to predetermined thresholds as demonstrated in step 195. In each of steps 192 and 194, if the distance is not within the approach threshold or the drag criteria are not identified, the method 160 may return to step 190.

In step 194, if the drag criteria are identified, the controller 14 may modify or update a search window for the coupler 16 based on the distance $D_c$ calculated based on the traversed distance calculated from the motion of the vehicle 12 (196). The controller 14 may then attempt to identify the coupler 16 and the corresponding coupler position 24 in the updated search window (198). The time available for the system 10 to identify the coupler 16 in the updated search window may be set to a timeout threshold saved in the memory 84 as demonstrated in step 199. If the coupler 16 is identified in the updated search window, the controller 14 may continue the method 160 and return to step 190. If the coupler 16 is not identified in the updated search window within the timeout threshold, the controller 14 may halt the alignment procedure and output an indication of the error to the HMI 66 in step 200.

Though discussed separately in methods 130 and 160 as well as the additional procedures and routines discussed herein may be implemented in various combinations. Accordingly, the specific detailed steps discussed in reference to the various embodiments and methods described herein are examples provided to demonstrate some useful applications of the systems and devices disclosed by the application. It shall be understood that though specific devices are discussed in reference to the system 10, various devices that may provide similar operational characteristics may be implemented to provide the methods discussed herein. Accordingly, the detailed embodiments provided herein shall not be considered limiting to the scope of the disclosure.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle system configured to control a trailer alignment routine, comprising:
   a hitch mounted on a vehicle; and
   a controller configured to:
   identify a coupler position of a trailer;
   control motion of the vehicle toward an aligned position;
   calculate a first stopping distance based on a velocity of the vehicle; and
   control a deceleration procedure comprising a plurality of concurrent deceleration control procedures in response to a portion of the vehicle passing the first stopping distance, wherein the concurrent deceleration procedures comprise:
   controlling a first deceleration request by controlling the deceleration procedure of the vehicle based on a first deceleration profile;
   monitoring an elapsed time in response to the portion of the vehicle passing the first stopping distance;
   monitoring a remaining distance based on the velocity of the vehicle and comparing the remaining distance to a second stopping distance, wherein the first stopping distance is greater than the second stopping distance; and
   controlling a second deceleration request by controlling the deceleration procedure of the vehicle based on a second deceleration profile in response to the portion of the vehicle passing the second stopping distance at the velocity greater than a controlled velocity associated with the first deceleration profile.

2. The system according to claim 1, wherein the concurrent deceleration procedures further comprise:
   processing a first deceleration request based on the remaining distance to the coupler position and the velocity of the vehicle at the first stopping distance.

3. The system according to claim 1, wherein the controller is further configured to:
   calculate the first stopping distance based on the first deceleration profile.

4. The system according to claim 3, wherein the first stopping distance is calculated based on the velocity and a rate of deceleration of the first deceleration profile.

5. The system according to claim 1, wherein the controller is configured to apply the second deceleration profile in response to the elapsed time reaching a calculated time duration.

6. The system according to claim 5, wherein the first deceleration profile comprises a lower average rate of deceleration relative to the second deceleration profile.

7. The system according to claim 5, wherein the controller is further configured to:
   control the vehicle to stop over the second deceleration profile in response to the elapsed time reaching the calculated time duration.

8. The system according to claim 5, wherein the controller is further configured to:
control the vehicle to stop over the second deceleration profile in response to the hitch passing the second stopping distance at a velocity exceeding a second stopping distance.

9. A method for controlling a vehicle comprising:
identifying a coupler position of a trailer in sensor data;
controlling motion of the vehicle to an aligned position aligning a hitch ball of the vehicle with the coupler position;
calculating a first stopping distance based on a velocity of the vehicle;
controlling a deceleration procedure comprising a plurality of concurrent deceleration control procedures in response to a portion of the vehicle passing the first stopping distance, wherein the concurrent deceleration procedures comprise:
monitoring an elapsed time in response to the portion of the vehicle passing the first stopping distance; and
monitoring a remaining distance based on the velocity of the vehicle and comparing the remaining distance to a second stopping distance, wherein the first stopping distance is greater than the second stopping distance;
controlling the deceleration procedure based on a first deceleration profile in response to the portion of the vehicle passing the first stopping distance; and
controlling the deceleration procedure of the vehicle based on a second deceleration profile in response to the elapsed time reaching a calculated time duration, wherein the calculated time is determined based on the first stopping distance, the velocity of the vehicle, and the first deceleration profile.

10. The method according to claim 9, further comprising:
controlling the deceleration procedure of the vehicle based on the second deceleration profile in response to:
the portion of the vehicle passing the rapid stopping distance at the velocity greater than a controlled velocity associated with the first deceleration profile.

11. A vehicle control system configured to control a vehicle alignment routine with a trailer, comprising:
a controller configured to:
identify a coupler position of the trailer;
control motion of the vehicle toward an aligned position;
calculate a first stopping distance based on a velocity of the vehicle; and
control a deceleration procedure comprising a plurality of concurrent deceleration control procedures in response to a portion of the vehicle passing the first stopping distance, wherein the concurrent deceleration procedures comprise:
monitoring an elapsed time in response to the portion of the vehicle passing the first stopping distance;
monitoring a remaining distance based on the velocity of the vehicle and comparing the remaining distance to a second stopping distance, wherein the first stopping distance is greater than the second stopping distance; and
controlling the deceleration procedure in response to at least one of:
the elapsed time of the portion of the vehicle passing the first stopping distance; and
the remaining distance based on the velocity of the vehicle compared to the second stopping distance.

12. The system according to claim 11, wherein the controller is further configured to:
calculate the first stopping distance based on a first deceleration profile;
controlling the deceleration procedure based on the first deceleration profile in response to the portion of the vehicle passing the first stopping distance; and
calculate the second stopping distance based on a second deceleration profile.

13. The system according to claim 12, wherein the first stopping distance is calculated based on the velocity and a rate of deceleration of the first deceleration profile.

14. The system according to claim 12, wherein the first deceleration profile comprises a lower average rate of deceleration relative to the second deceleration profile.

15. The system according to claim 14, wherein the controller is further configured to:
control the vehicle to decelerate over the second deceleration profile in response to a hitch passing the second stopping distance at a velocity exceeding the second stopping distance.

16. The system according to claim 12, wherein at least one of the first deceleration profile and the second deceleration profile decelerates the vehicle by controlling a brake system of the vehicle.

17. The system according to claim 12, wherein at least one of the first deceleration profile and the second deceleration profile decelerates the vehicle by controlling a drive gear selection of the vehicle.

18. The system according to claim 12, wherein at least one of the first deceleration profile and the second deceleration profile decelerates the vehicle by controlling a steering system of the vehicle.

19. The system according to claim 14, wherein the controller is configured to control the deceleration procedure of the vehicle based on the second deceleration profile in response to cessation of the vehicle alignment routine with the trailer.

20. The system according to claim 14, wherein the elapsed time of the portion of the vehicle passing the first stopping distance is greater than a calculated time duration, and wherein the controller controls the deceleration procedure of the vehicle based on the second deceleration profile.

* * * * *